United States Patent [19]
Laughlin, deceased et al.

[11] 4,032,126
[45] June 28, 1977

[54] SHOCK ABSORBING APPARATUS

[76] Inventors: William N. Laughlin, deceased, late of Lafayette, La.; by Thomas L. Hollis, executor, P.O. Box 51422, O.C.S., Lafayette, La. 70501

[22] Filed: Mar. 29, 1976

[21] Appl. No.: 671,600

[52] U.S. Cl. .................. 267/116; 293/88; 61/48; 114/219; 188/298

[51] Int. Cl.² ............ B61G 9/16; E02B 3/22

[58] Field of Search ........... 267/116, 139, 140, 35; 293/71 P, 87, 88, DIG. 2; 61/48; 114/219; 188/298, 1 B; 213/43

[56] References Cited
UNITED STATES PATENTS

| 2,387,065 | 10/1945 | Harding | 188/298 |
| 2,655,005 | 10/1953 | Kinnemon | 61/48 |
| 3,564,858 | 2/1971 | Pogonowski | 114/219 |
| 3,658,314 | 4/1972 | Luzsicza | 267/35 |
| 3,864,922 | 2/1975 | Dial et al. | 114/219 |
| 3,873,075 | 3/1975 | Pamer | 293/88 |

FOREIGN PATENTS OR APPLICATIONS

| 77,941 | 9/1949 | Czechoslovakia | 267/35 |

Primary Examiner—James B. Marbert
Attorney, Agent, or Firm—Arnold, White & Durkee

[57] ABSTRACT

A housing having a closed end and an open end with a first and second flexible sealing member attached to the inside surface of the housing, a piston carried out of contact with the inside surface of the housing by the first and second flexible sealing members, and a perforate baffle positioned inside the housing between the first and second flexible sealing members are disclosed. A chamber defined by the closed end of the housing and the first flexible sealing member may be filled with a compressible fluid, and a chamber defined by the first and second flexible sealing members may be filled with an incompressible fluid. A one-way valve may cover a perforation in the baffle.

26 Claims, 8 Drawing Figures

SHOCK ABSORBING APPARATUS

BACKGROUND OF THE INVENTION

The present invention relates generally to shock absorbing apparatus. In particular, the present invention relates to shock absorbing apparatus operable to provide dissipation of forces imposed upon a dock, floating platform, offshore oil rig, or the like, which may occur as a result of impact by a floating vessel such as a barge, crew boat or the like. The present invention will find particular utility in connection with boat bumpers for offshore platforms, but, as will become apparent, the apparatus of this invention may have wide applicability extending beyond such offshore uses.

In an exposed environment such as an oil well platform located many miles offshore, severe weather conditions impose a variety of problems. For example, high winds and large waves may make the docking of a barge or other vessel to the offshore platform extremely difficult and hazardous. During adverse weather conditions the vessel may rub against the platform with great force, or the action of the wind and the sea may be of sufficient force to effect a collision between the vessel and the docking facility which may result in great damage to the platform and vessel as well as injury to personnel aboard the platform. The vessel may be punctured by such a collision and may sink or otherwise be severly damaged.

A collapse or displacement of a portion of the platform due to a collision may impede oil drilling or producing activities with severe adverse economic consequences. If gas or oil lines are ruptured by such collision, explosion or fire may result. In addition, a rupturing of such lines can result in ecological damage along a shoreline many miles away.

In order to reduce the undesirable effects of collision between a floating vessel and a docking facility, bumpers are used on both vessels and docking facilities to cushion impact and protect the surfaces coming into contact during such collisions. In the past, old automobile tires were placed around the periphery of loading docks in order to reduce the adverse effects of impact. More recently, cushioned bumpers which have been shock mounted upon such platforms have been used. However, in an offshore environment during extreme weather conditions, a beam sea could drive a vessel against a platform with such force that presently known arrangements would no longer serve to prevent serious damage to the vessel or to the platform.

It is known to mount bumpers upon shock absorbing devices on offshore platforms which arrangement serves to dissipate the forces imposed upon the platform when a vessel collides with a bumper. Such arrangements generally comprise a substantially vertically disposed elongate cushioning element which is positioned to lie partially below and partially above the mean water line. These cushioning devices, which usually comprise a rod covered by some rubber-like cushioning material, are attached at their upper ends to the platform through a shock absorber of some kind. The bottom of the cushioning element, or rod, is either anchored, pivotably mounted or shock mounted to the platform below the level of the water.

A shock absorber or shock cell used in conjunction with offshore platform bumpers may be required to absorb forces in the order of 100 tons or so. Therefore, such shock cells must have great structural integrity without being economically impractical.

In addition, such a shock cell must be corrosion resistant to salt water and to those contaminants which may accidently spill into the environs of the platform during drilling or producing operations. This is particularly the case for a shock cell positioned below the water line around the platform. Moreover, a shock cell for use in conjunction with an offshore platform is desirably maintenance free and of high reliability to minimize the occurrences of damage to the platform as a result of shock cell failure. Ordinarily, shock cells and bumpers are placed on a platform before the platform is positioned in a body of water. After a platform has been situated offshore, maintenance or replacement of a shock cell can be most cumbersome and require much more time and expense than required during initial assembly.

OBJECTS AND SUMMARY OF A PREFERRED EMBODIMENT OF THE INVENTION

It is, therefore, a general object of the present invention to provide a novel shock absorbing apparatus which eliminates or minimizes problems of the type previously noted.

It is a more particular object of the present invention to provide a novel shock absorbing apparatus for use in conjunction with an offshore platform.

It is another object of the present invention to provide a novel shock absorbing apparatus which has high reliability, and is both corrosion resistant and relatively maintenance free.

A shock absorbing apparatus according to a preferred embodiment of the present invention intended to substantially accomplish the foregoing objects includes a cylinder or housing having a closed end and an open end. A first flexible sealing member is attached to the interior wall of the cylinder at a first location, and a second flexible sealing member is attached to the interior wall of the cylinder at a second location. A piston is carried out of contact with the walls of the cylinder by the first and second flexible sealing members. The piston is bonded or otherwise affixed to the sealing members to prevent relative movement between these members. The first flexible member and the closed end of the cylinder define a first chamber within the cylinder. The second flexible member and the first flexible member define a second chamber within the cylinder. A baffle or valve plate is preferably attached to the interior wall of the cylinder within the second chamber and has an aperture through which the piston passes. Ports are provided for the first and second chambers respectively for introducing a compressible fluid, such as air, into the first chamber and a relatively incompressible fluid, such as hydraulic oil, into the second chamber. The baffle may be perforated or provided with one-way valves in order to regulate flow of the hydraulic oil or other incompressible fluid around the baffle. The piston is operable to deflect the first and second flexible seals when the piston is axially displaced. The deflection of the first flexible seal tends to compress the air in the first chamber. The deflection of the first and second flexible seals tends to transfer hydraulic oil around the baffle.

Examples of the more important structural aspects of an apparatus of this invention have thus been summarized rather broadly in order that the detailed description that follows may be better understood and in order that the contribution to the art may be better appreciated. There are, of course, additional features of the invention that will be described hereinafter and which will also form the subject of the appended claims. Other objects and features of the present invention will become apparant with reference to the following detailed description of a preferred embodiment thereof in connection with the accompanying drawings wherein like reference numerals have been applied to like elements, in which:

Figure 1:
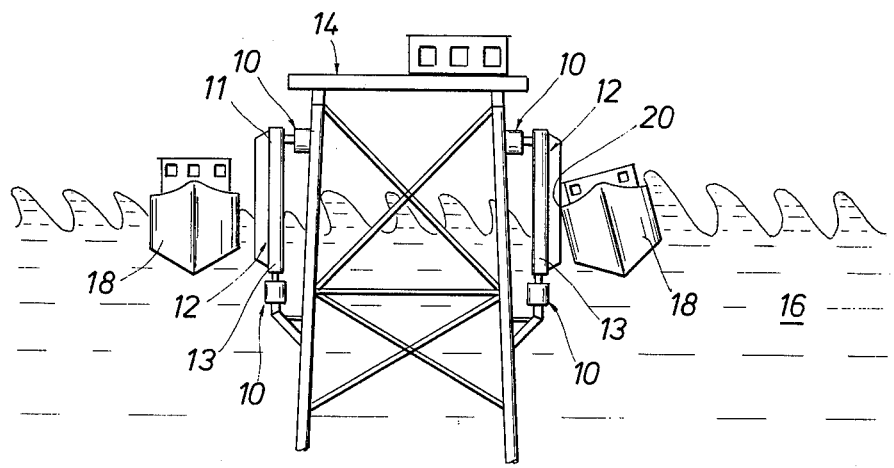
FIG. 1 schematically depicts the use of the apparatus of the present invention in conjunction with bumpers on an offshore platform.

With reference now to the drawings and particularly to FIG. 1, a shock absorbing apparatus 10 of the present invention may be used in conjunction with a bumper 12 intended for use on an offshore drilling platform 14 in a corrosive, salt water environment 16. The shock absorbing apparatus 10 is intended to attenuate the shock produced on the drilling platform 14 when a tanker or other ship 18 tied up to or approaching such a platform bumps into it as depicted at 20. In some applications, it may be desirable to shock mount the bumper 12 at an upper end 11 for horizontal displacement and at a bottom end 13 for a combined pivotal and vertical displacement. As will become apparent, the apparatus 10 is operable to provide both axial shock absorbing action and support for slight pivotal or radial displacement.

Figure 2:
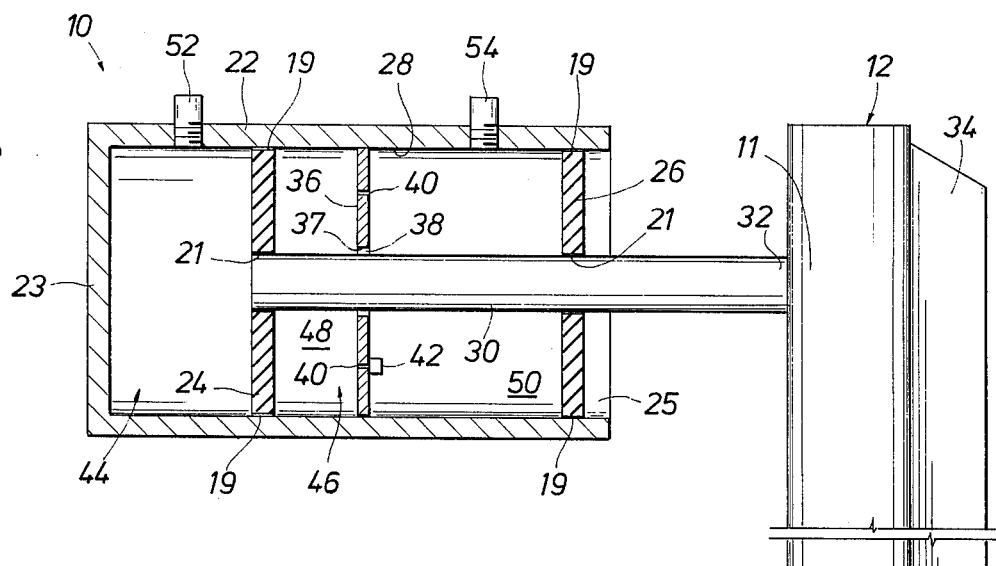
FIG. 2 is a longitudinal, cross-sectional view in partly schematic form of a shock absorbing apparatus according to the present invention.

With particular reference to FIG. 2, the shock absorbing apparatus or shock cell 10 includes a cylindrical, cup-shaped housing 22 containing two annular rubber seals or flexible sealing members 24 and 26. These seals may be fashioned from a material other than rubber so long as the seals demonstrate the appropriate characteristics as will be discussed below. Each of the seals 24 and 26 is bonded along an outer edge 19 to the inner wall 28 of the housing and along an inner edge 21 to a shaft or piston 30. The art of bonding rubber and rubber-like materials to metal is well known and does not specifically form a part of the present invention.

The piston 30 is coaxial with the cylindrical housing structure 22. At an outer end 32 of the piston 30 there is attached an impact-receiving structure or bumper 34. This bumper may be a rubber-faced plate, a rubber-surrounded rod, an automobile bumper, or other contact device through which axial forces may be applied to the shock absorber 10.

An annular dividing plate or baffle 36 extends radially inwardly from the inner wall 28 of the housing between the two rubber seals 24 and 26. The baffle 36 does not contact the piston 30, but rather defines an annular passage 38 between those two members. The clearance between the piston 30 and an interior surface 37 of the baffle 36 is sufficient to permit the piston 30 to pivot slightly when carried by the two rubber seals 24 and 26 in the event of a significant radial force on the piston 30.

The annular baffle 36 may include a number of holes or passages 40 spaced at various locations thereon. In addition, a one-way check valve arrangement 42 as will be discussed in greater detail below may be utilized in connection with each of the passages 40.

It will be appreciated that the above-described structure defines two isolated chambers 44 and 46 respectively within the housing 22. The first chamber 44 is defined by the first flexible sealing member 24 and an end wall 23 of the cylindrical housing 22. The second chamber 46 is defined by the first flexible sealing member 24 and the second flexible sealing member 26. It will be further appreciated that the second flexible sealing member 26 is operable to seal an open end 25 of the cylindrical housing 22. The second chamber 46 is divided into two zones 48 and 50 respectively by the baffle 36.

When force is exerted axially along the shaft or piston 30 towards the housing 22 as a result of impact on the bumper 34, the two flexible seals 24 and 26 will deflect and absorb some of the energy. The first chamber 44 will be reduced in volume, and, by filling the first chamber 44 with a compressible fluid, such as air, compression of the fluid will also store energy.

As noted above, zones 48 and 50 communicate through the annular passage 38 and ports 40. As the piston 30 moves into the housing 22 the geometry or shape of the second chamber 46 will change. However, the overall volume of the second chamber will remain substantially constant with a result that the volume of zone 48 increases and that of zone 50 decreases as the piston 30 is displaced into the housing 22. By filling these zones 48 and 50 with an incompressible fluid, such as hydraulic oil, the overall resistance of the piston 30 to movement may be increased. The rate of movement of the piston 30 will be limited to some extent by the flow of the hydraulic oil from zone 50 to 48. Inward movement of the piston 30 may be opposed by initially pressurizing the fluid in the first chamber 44. The increased pressure within the first chamber 44 occasioned by the displacement of the piston 30 will tend to return the piston 30 (and member 34) to an initial position and ready the apparatus for another impact. Accordingly, a first chamber port 52 is provided for the introduction of a compressible fluid into chamber 44. A second chamber port 54 is provided for the introduction of hydraulic oil into the second chamber 46.

The return rate of the shock absorbing apparatus 10 may be controlled by the use of the one-way check valve 42 over the port 40. The check valve 42 may be a flapper valve or a spring-loaded ball valve or any other suitable arrangement. In this way, the area for flow of hydraulic oil from zone 50 to zone 48 on the inward movement of the piston 30 is limited to the annulus 24, while on the outward movement of the piston 30, the area of ports 40 is also available. It will be further appreciated that by varying the diameter of piston 30 along its length as shown at 31 in FIG. 3, the shock absorbing apparatus may be tuned to offer greater or less resistance to further movement depending upon the position of the piston 30, as the area of the annular passage 38 may then be made a function of shaft position.

Figure 4:
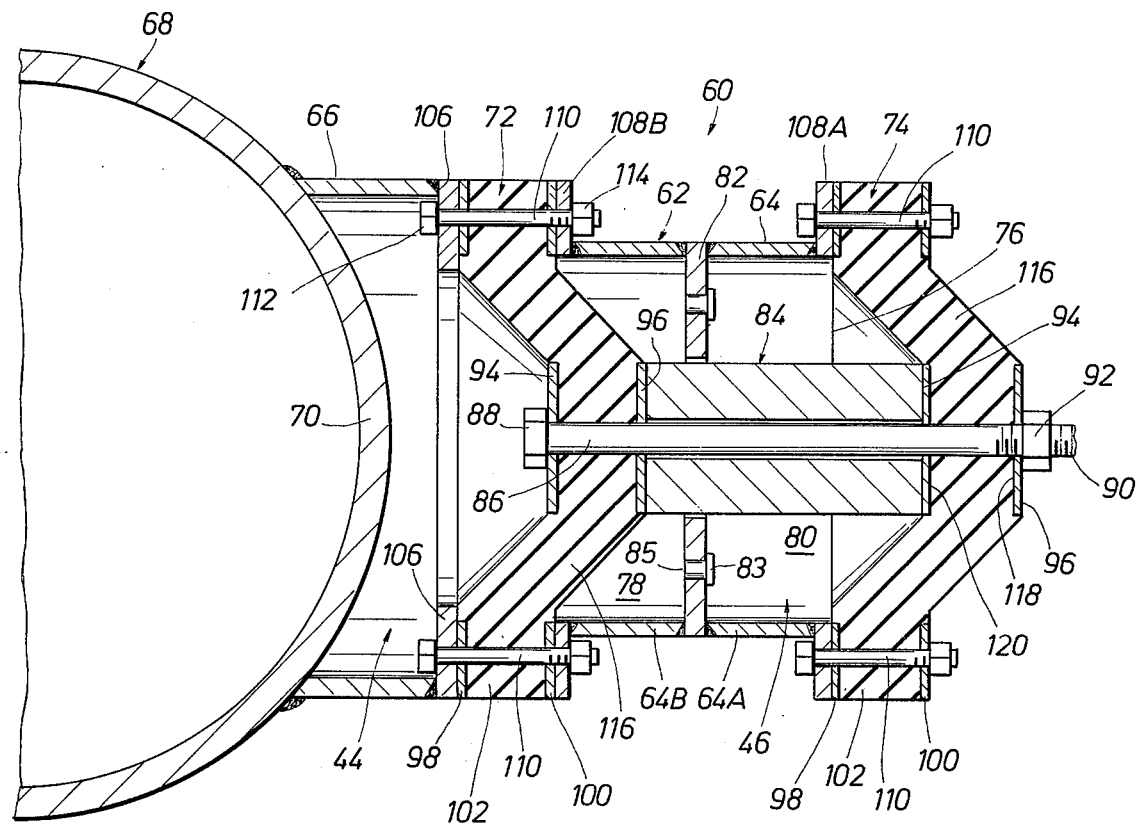
FIG. 4 is a longitudinal, cross-sectional view of a second alternative embodiment of a shock absorbing apparatus according to the present invention wherein an offshore platform leg comprises an end wall of a first chamber.

With particular reference now to FIG. 4, there may be seen a second alternative arrangement 60 for the shock absorbing apparatus of the present invention which functions in substantially the same manner as described above in connection with FIGS. 1 and 2. This embodiment utilizes a two-piece housing 62. This two-piece housing 62 is comprised of an outboard housing member 64 having a generally cylindrical shape and an inboard housing member 66 having either a cylindrical or rectangular shape. The inboard housing member 66 is preferably welded to a metallic portion of the object being protected, for example, a platform leg 68, to provide an end wall portion 70 for the housing 62.

Figure 3:
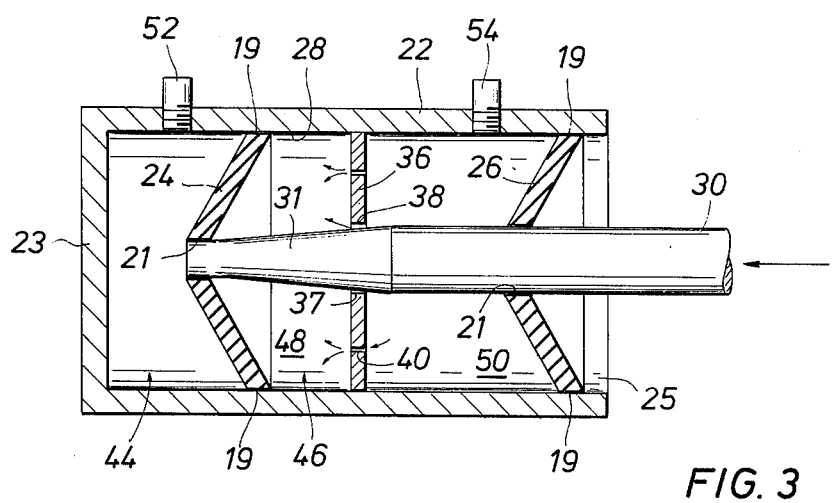
FIG. 3 is a longitudinal, cross-sectional view of a first alternative embodiment of a shock absorbing apparatus according to the present invention wherein the piston has been displaced.

As in the case of the embodiments depicted in FIGS. 2 and 3, the embodiment of FIG. 4 is arranged to provide two chambers 44 and 46. The first chamber 44 is defined by a first flexible sealing member 72, the inboard housing member 66 and the member 70 to which the housing may be sealingly attached, in preferred use, the offshore oil platform leg 68.

The second chamber 46 is defined by the first flexible sealing member 72 and a second flexible sealing member 74. It will be appreciated that the second flexible sealing member 74 is operable to seal an end 76 of the outboard cylindrical housing member 64. Moreover, the second chamber 46 is divided into two zones, 78 and 80, by a baffle 82. This baffle, which is preferably a perforate annular plate, may be welded to an interior surface of the outboard cylindrical housing member 64 or may lie intermediate two housing portions 64A and 64B which are joined together at the baffle 82. As discussed above, this baffle 82 may have a one-way valve 83, schematically shown in FIG. 4, to control the flow of fluid through perforations 85 therein.

This baffle 82 has an inner diameter large enough to facilitate the passage of a piston 84 therethrough without coming into contact with the baffle 82. The piston 84 is perferably comprised of hard rubber or the like and joins together the first and second flexible sealing members 72 and 74 by means of a connecting rod or bolt 86. Preferably this bolt is stainless steel and has a head 88 at one end and threads 90 at another end. A nut 92 may be provided to hold the bolt 86 in place. The threads 90 may be utilized to fasten an appropriate bumper or impact surface (not shown) to the apparatus 60 as in the case of the earlier described embodiments.

To facilitate assembly and production of the apparatus 60, it is preferred that the first and second flexible sealing members 72 and 74 be substantially the same in construction. In the preferred form of the apparatus 60, each flexible sealing member has a pair of washers or steel discs 94 and 96 molded or vulcanized to lower and upper surfaces respectively to each flexible sealing member. These washers serve to evenly distribute to the flexible sealing members forces transmitted thereto by means of the connecting bolt 86 and the piston 84.

Figure 5:
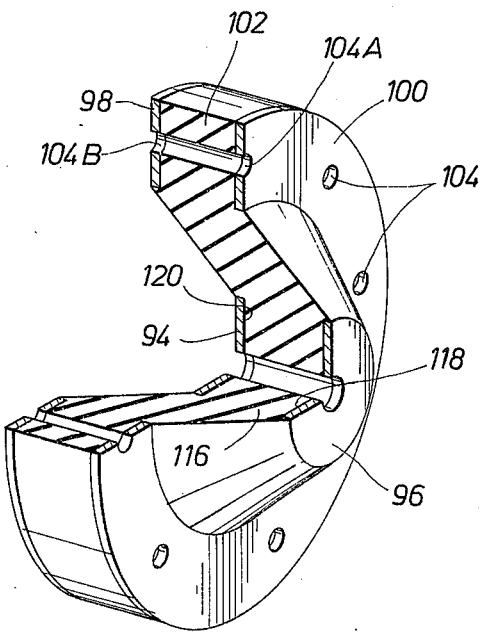
FIG. 5 is an axonometric, partial-sectional detailed view of a flexible sealing member of the apparatus of FIG. 4.

In the preferred form of this embodiment 60, a pair of steel rings 98 and 100 are bonded or vulcanized to a base portion 102 of the flexible sealing members 72 and 74. As shown in FIGS. 4 and 5, these steel rings 98 and 100 may have bolt-holes 104 every 45° or so. It will, of course, be appreciated that each flexible sealing member is perforated in a manner to permit a bolt to pass through a hole 104A in the upper steel ring 100, through the base portion 102, and through a hole 104B in the bottom steel ring 98 in registry with the hole 104A in the upper steel ring. It has been found that the arrangement disclosed in connection with FIG. 5 greatly facilitates assembly of the apparatus in FIG. 4.

Each sealing member may be molded from rubber or other suitable material displaying appropriate characteristics. As may be seen in FIG. 5, the sealing member has the base portion 102 and a truncated conical body portion 116. A land 118 is provided to accommodate the top or upper steel disc or washer 96. A corresponding surface 120 is provided to receive the bottom or lower steel disc or washer 94.

An annular flange or collar 106 is preferably welded or otherwise appropriately affixed to the inboard housing portion 66. This flange 106 may have holes drilled in it by conventional means, which holes would be positioned to correspond with the holes 104 in the steel rings 98 and 100.

Similarly, a pair of annular flanges 108A and 108B may be welded or otherwise appropriately bonded to the ends of the outboard cylindrical housing member 64. These flanges 108 have holes drilled therein corresponding with the holes in the steel rings and flexible sealing members in order to provide a passage for sealing bolts 110, each of which has a head 112 and a nut 114 threaded thereto.

As in the case of the embodiments depicted in FIGS. 2 and 3, ports (not shown) are provided for the introduction of fluids into the first and second chambers 44 and 46. In this connection, the operation of the embodiment shown in FIG. 4 is essentially the same as that described above in connection with FIG. 2 and no further elaboration need be made. However, it should be pointed out that the piston 84 of the embodiment in FIG. 4 preferably comprises a rubberized material. In the event an unusually severe radial force is imposed on the piston, this arrangement may serve to cushion any impact between the piston and the interior diameter of the baffle 82.

Figure 8:
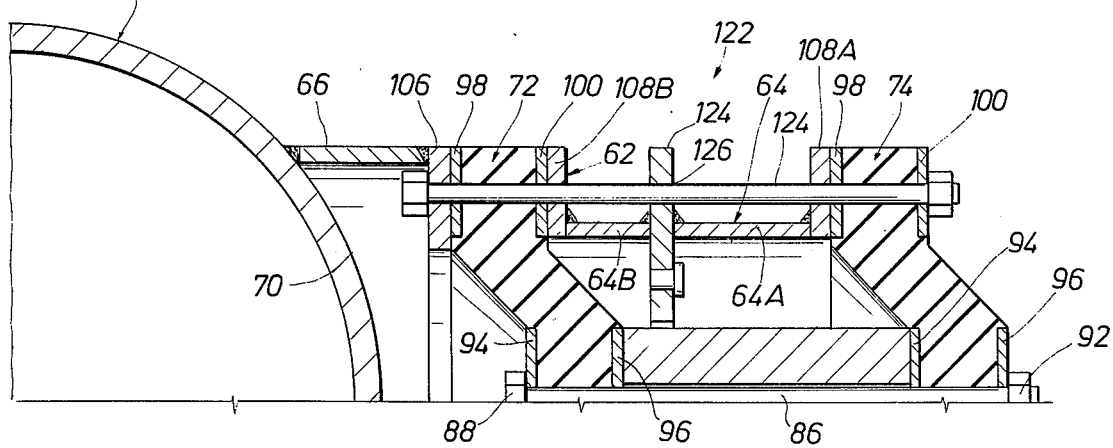
FIG. 8 is a partial longitudinal, corss-sectional view of an alternative assembly arrangement for the apparatus depicted in FIG. 4.

FIG. 8 shows an alternative arrangement 122 for the embodiment depicted in FIG. 4. It may be desirable in some circumstances to utilize a single bolt 124 to secure the first and second flexible sealing members 72 and 74 to the housing 62. Moreover, the outboard cylindrical housing member 64 may be fashioned from two sections 64A and 64B which are mutually joined to a baffle 124 having a somewhat extended outer diameter. This baffle 124 may have holes 126 or perforations therein in registry with the holes in the flanges 108A and 108B attached to the outboard housing member 64. This arrangement permits the bolt 124 to be passed through the inboard housing portion flange 106, first flexible sealing member 72, one outboard housing flange 108B, the baffle 124, another outboard housing flange 108A, and the second flexible sealing member 74.

Figure 6:
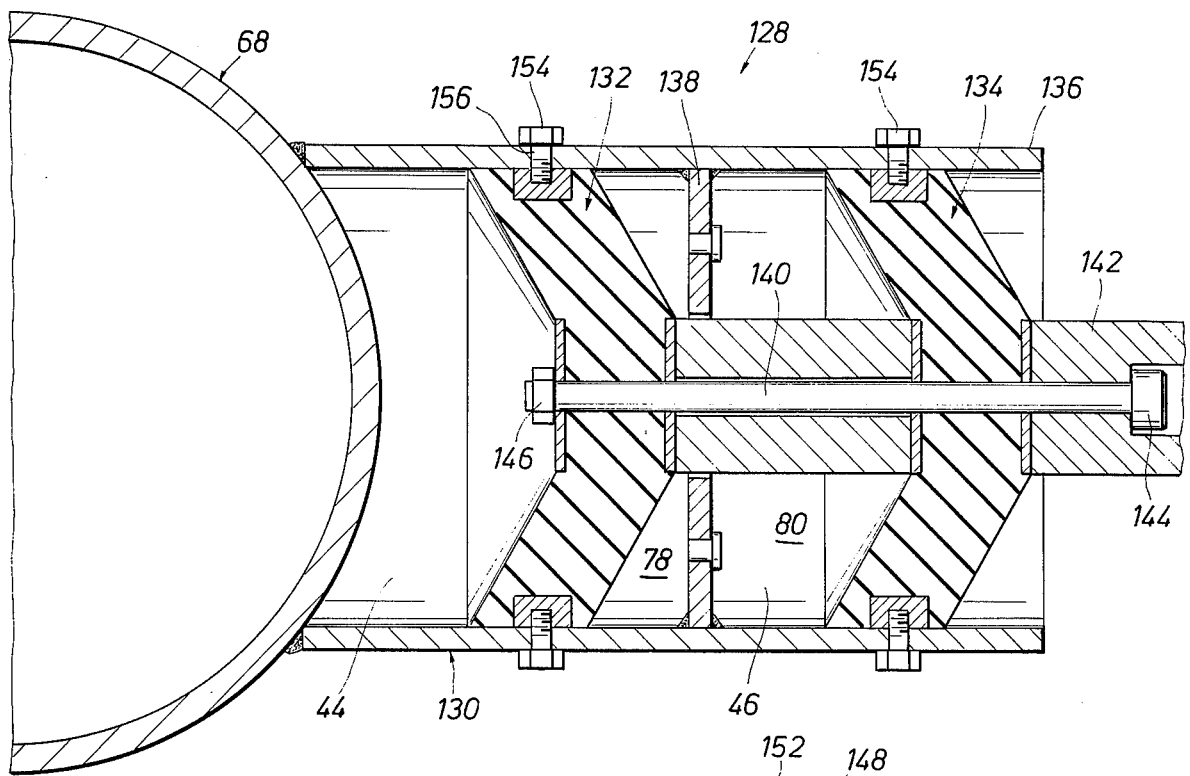
FIG. 6 is a longitudinal, cross-sectional view of a third alternative embodiment of a shock absorbing apparatus according to the present invention.
Figure 7:
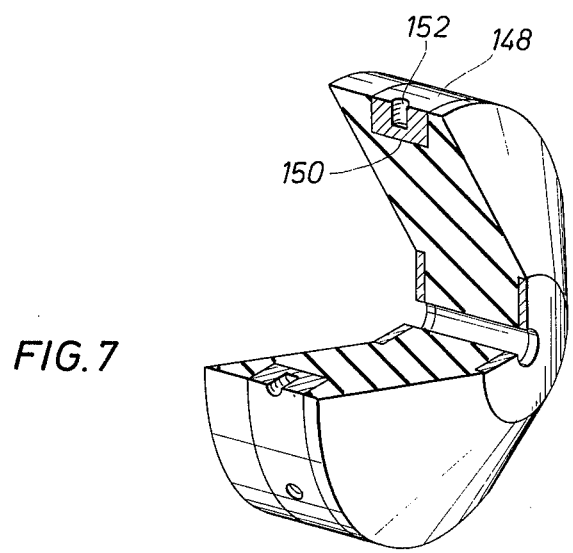
FIG. 7 is an axonometric, partial-sectional detailed view of a flexible sealing member of the apparatus of FIG. 6.

With reference now to FIGS. 6 and 7, there may be seen yet another alternative embodiment 128 of the present invention. The shock absorbing apparatus or shock cell 128 shown in FIG. 6 includes a cylindrical housing 130 containing two flexible sealing members 132 and 134. One of these sealing members is shown in FIG. 7. As in the case of the embodiments shown in FIGS. 4, 5 and 8, these seals 132 and 134 may be fashioned from rubber or some similar material so long as the seals demonstrate the appropriate characteristics.

The cylindrical housing 130 is arranged to provide two chambers 44 and 46. The first chamber 44 is defined by the first flexible sealing member 132 and a member to which the housing 130 may be sealingly attached, which in the illustrated embodiment is an offshore platform leg 68.

The second chamber 46 is defined by the first flexible sealing member 132 and the second flexible sealing member 134. As in the embodiments disclosed above, the second flexible sealing member 134 is operable to seal an end 136 of the housing 130. Moreover, the second chamber 46 is divided into two zones 78 and 80 by a baffle 138. This baffle, which is preferably a perforate annular plate, may be welded to an interior surface of the housing 130.

As in the case of above-described embodiments, the baffle 138 has an interior diameter large enough to facilitate the passage of the piston 84 therethrough without coming into contact with the baffle 138. The piston 82 is preferably comprised of hard rubber or the like and joins together the first and second flexible sealing members 132 and 134 by means of a connecting rod or bolt 140. The bolt 140 may be used to attach the shock-absorbing apparatus 128 to a bumper or the like, schematically shown as 142. Preferably, this bolt 140 is stainless steel and has a head 144 at one end and a nut 146 threaded to the other end.

In preferred form, the sealing members 132 and 134 are identical and may be interchanged. Each sealing member 132, 134, has an attachment ring 148 molded or otherwise affixed in a circumferential channel 150 in the sealing member. The attachment ring has a series of threaded holes 152 spaced at approximately 22½° apart. As may be appreciated from FIG. 6, each of the flexible sealing members is held in position with respect to the housing 130 as a result of cooperation with fastening bolts 154 which pass through apertures 156 in the housing 130.

As in the case of the other embodiments described above, ports (not shown) are provided for the introduction of fluid into chambers 44 and 46.

Whereas a preferred embodiment of the present invention includes a baffle attached to the housing and having a central aperture through which the piston passes, it will be appreciated that a baffle may be fashioned which is attached to the piston and which is carried out of contact with the inside wall of the housing. With such an alternative arrangement, the housing could be tapered to tune the apparatus in the same manner as described above.

SUMMARY OF ADVANTAGES AND SCOPE OF THE INVENTION

It will be appreciated that in constructing a shock absorbing apparatus according to the present invention, certain significant advantages are provided. For example, one of the principal advantages of this apparatus is that there are no moving parts exposed to the environment. The outermost or second seal being bonded or otherwise sealingly fastened to both the housing and the piston, prevents corrosive elements from reaching the interior of the apparatus particularly any valves operatively associated with the baffle. The reliability thus obtained is extremely important in offshore applications, where the labor involved in replacing defective shock cells often greatly exceed the value of the shock cells themselves.

In addition, because the piston and the cylinder or housing do not make contact during operation of the apparatus, there may be virtually no moving parts to wear out or otherwise become inoperative. Because there is essentially no relative movement between the piston and the flexible seals and between the housing and the flexible seals, the apparatus of the present invention may be substantially frictionless in operation.

In the rare event the apparatus of the present invention needs replacing or repair, the embodiments shown in FIGS. 4 and 8 are particularly adapted to extremely rapid replacement in that the principle operational elements may be unbolted from an inboard housing portion and a new shock cell substituted therefor with a relative minimum of difficulty.

The foregoing description of the invention has been directed to a particular preferred embodiment in accordance with the requirements of the patent statutes and for purposes of explanation and illustration. It will be apparent, however, to those skilled in this art that many modifications and changes in the apparatus may be made without departing from the scope and spirit of the invention. It will be further apparent that the invention may also be utilized, with suitable modifications within the state of the art, in applications other than that specifically set forth above. For example, a shock absorbing apparatus according to the present invention may be used in conjunction with automobile bumpers, aircraft or spacecraft landing gear and railway vehicles. These, and other applications of the apparatus of the invention will be apparent to those skilled in this art. It is applicant's intention in the following claims to cover all such equivalent modifications and variations as fall within the true spirit and scope of the invention.

What is claimed is:

1. A shock absorbing apparatus comprising:
    a casing;
    an end wall for closing an end of the casing;
    a piston movably disposed within said casing;
    a first resilient seal attached to said piston and to an interior wall of said casing and cooperable with said end wall and a first portion of said casing to define a first closed chamber;
    a second resilient seal attached to said piston and to the interior wall of said casing and cooperable with a second portion of said casing and said first resilient means to define a second closed chamber;
    a baffle attached to the interior wall of said casing in said second closed chamber and comprising an interior edge defining an aperture through which said piston passes without coming into contact with said baffle, said baffle being operable to generally divide said second chamber into a first zone and a second zone;
    a first port for introducing a compressible fluid into said first closed chamber;
    a second port for introducing a relatively incompressible fluid into said second closed chamber;

said first resilient seal being operable to affect a compression of said compressible fluid when impact displaces said piston axially towards said first closed chamber;

said first and said second resilient seals being cooperable to affect a displacement of said relatively incompressible fluid from said first zone to said second zone when an impact displaces said piston axially towards said first closed chamber.

2. The apparatus of claim 1 wherein said baffle is perforate.

3. The apparatus of claim 2 wherein a one-way valve is operatively positioned with respect to a perforation in said baffle.

4. The apparatus of claim 1 wherein said compressible fluid is air and said relatively incompressible fluid is hydraulic oil.

5. The apparatus of claim 1 and further comprising a bumper element attached to an end of said piston.

6. The apparatus of claim 5 wherein said bumper element comprises a relatively rigid member, and a cushioning cover carried by at least one surface of said relatively rigid member.

7. A shock absorbing system comprising:
a cylinder mounted on a relatively fixed object;
a piston movably disposed within an interior of said cylinder;
an impact-receiving bumper element carried by an end of said piston extending beyond said cylinder and arranged to absorb impact from a relatively movable object moving towards the relatively fixed object;
a first flexible seal attached along an outer surface to the interior of the cylinder at a first location and attached along an inner surface to said piston;
a second flexible seal attached along an outer surface to the interior of the cylinder at a second location and attached along an inner surface to said piston;
said first and said second flexible seals being operable to divide the interior of said cylinder into two chambers sealingly separated from each other and from the exterior of said cylinder, a first of said two chambers being of variable geometry and variable volume and a second of said two chambers being of variable geometry and relatively constant volume;
a baffle positioned in said second chamber and operable to separate said second chamber into a first zone and a second zone;
said piston, cylinder, first and second flexible seals and said baffle being cooperable when an impact is transferred to said bumper element tending to displace said piston axially towards said cylinder, to reduce the volume of said first chamber, reduce the volume of said first zone of said second chamber, and increase the volume of said second zone of said second chamber while controlling a rate at which the respective volumes of said first and said second zones change.

8. The system of claim 7 wherein said baffle is perforate.

9. The system of claim 8 wherein a one-way valve is operatively positioned with respect to a perforation in said baffle.

10. The system of claim 7 and further comprising:
a first port in said cylinder for introducing a first fluid into said first chamber; and
a second port in said cylinder for introducing a second fluid into said chamber.

11. The system of claim 10 wherein said first fluid is compressible and said second fluid is incompressible.

12. The system of claim 11 wherein said first fluid is air and said second fluid is hydraulic oil.

13. The system of claim 7 wherein said bumper element comprises a relatively rigid member, and a cushioning cover carried by at least one surface of said relatively rigid member.

14. A shock absorbing apparatus comprising
a housing mountable on a relatively fixed object;
a piston movably disposed within an interior of said housing;
a first flexible seal attached along an outer surface to the interior of the housing at a first location and attached along an inner surface to said piston;
a second flexible seal attached along an outer surface to the interior of the housing at a second location and attached along an inner surface to said piston;
said first and said second flexible seals being operable to divide the interior of said housing into two chambers sealingly separated from each other and from the exterior of said housing, a first of said two chambers being of variable geometry and variable volume and a second of said two chambers being of variable geometry and relatively constant volume;
a baffle positioned in said second chamber and operable to separate said second chamber into a first zone and a second zone;
said piston, said housing, said first and second flexible seals, and said baffle being cooperable when said piston is displaced generally axially toward said housing, to reduce the volume of said first chamber, reduce the volume of said first zone of said second chamber, and increase the volume of said second zone of said second chamber while controlling a rate at which the respective volumes of said first and second zones change.

15. The apparatus of claim 14 wherein said baffle is attached to the interior wall of said housing and comprises an interior edge defining an aperture through which said piston passes without coming into contact with said baffle.

16. The apparatus of claim 14 wherein said baffle is attached to said piston and comprises an exterior edge which does not come into contact with the interior of said housing when said piston is displaced towards said housing.

17. The apparatus of claim 16 wherein said exterior edge of said baffle and the interior of said housing define an annulus through which said first zone and said second zone are placed in fluid communication.

18. The apparatus of claim 14 wherein a length of said piston has a varied diameter.

19. The apparatus of claim 15 wherein said aperture through which said piston passes has an area which varies with the position of said piston.

20. The apparatus of claim 14 where said baffle is perforate.

21. The apparatus of claim 20 wherein a one-way valve is operatively positioned with respect to a perforation in said baffle.

22. The apparatus of claim 14 and further comprising
a first port in said housing for introducing a first fluid into said first chamber; and
a second port in said housing for introducing a second fluid into said second chamber.

23. The apparatus of claim 22 wherein said first fluid is compressible and said second fluid is incompressible.

24. The apparatus of claim 23 wherein said first fluid is air and said second fluid is hydraulic oil.

25. The apparatus of claim 14 and further comprising a bumper element attached to an end of said piston.

26. The apparatus of claim 25 wherein said bumper element comprises a relatively rigid member, and a cushioning cover carried by at least one surface of said relatively rigid member.

* * * * *